(12) United States Patent
Varadarajan et al.

(10) Patent No.: US 10,922,536 B2
(45) Date of Patent: *Feb. 16, 2021

(54) AGE CLASSIFICATION OF HUMANS BASED ON IMAGE DEPTH AND HUMAN POSE

(71) Applicant: Intel Corporation, Santa Clara, CA (US)

(72) Inventors: Srenivas Varadarajan, Bangalore (IN); Nikita Tiwari, Hillsboro, OR (US); Parual Datta, Bangalore (IN); Andradige Pubudu Madhawa Silva, Hillsboro, OR (US); Omesh Tickoo, Portland, OR (US); Erin Carroll, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,212

(22) Filed: Jan. 21, 2020

(65) Prior Publication Data
US 2020/0160049 A1 May 21, 2020

Related U.S. Application Data

(63) Continuation of application No. 15/821,461, filed on Nov. 22, 2017, now Pat. No. 10,540,545.

(51) Int. Cl.
*G06K 9/00* (2006.01)
*G06T 7/292* (2017.01)
*G06K 9/62* (2006.01)

(52) U.S. Cl.
CPC ..... *G06K 9/00369* (2013.01); *G06K 9/00362* (2013.01); *G06T 7/292* (2017.01); *G06K 9/628* (2013.01); *G06T 2207/20081* (2013.01); *G06T 2207/20084* (2013.01)

(58) Field of Classification Search
CPC .......... G06K 9/00362; G06K 9/00369; G06K 9/628; G06T 2207/20081; G06T 2207/20084; G06T 7/292
See application file for complete search history.

(56) References Cited

U.S. PATENT DOCUMENTS

2014/0270482 A1* 9/2014 Chakraborty ...... G06K 9/00677
382/154
2017/0286598 A1* 10/2017 Noordvyk .............. G16H 30/40

\* cited by examiner

*Primary Examiner* — Manuchehr Rahmjoo
(74) *Attorney, Agent, or Firm* — Jaffery Watson Mendonsa & Hamilton LLP

(57) ABSTRACT

A mechanism is described for facilitating age classification of humans using image depth and human pose according to one embodiment. A method of embodiments, as described herein, includes facilitating, by one or more cameras of a computing device, capturing of a video stream of a scene having persons, and computing overall-depth torso lengths of the persons based on depth torso lengths of the persons. The method may further include comparing the overall-depth torso lengths with a predetermined threshold value representing a separation age between adults and children, and classifying a first set of the persons as adults if a first set of the overall-depth torso lengths associated with the first set of persons is greater than the threshold value.

18 Claims, 11 Drawing Sheets

US 10,922,536 B2

AGE CLASSIFICATION OF HUMANS BASED ON IMAGE DEPTH AND HUMAN POSE

CLAIM TO PRIORITY

This Application is a continuation of and claims the benefit of and priority to U.S. application Ser. No. 15/821,461, entitled AGE CLASSIFICATION OF HUMANS BASED ON IMAGE DEPTH AND HUMAN POSE, by Srenivas Varadarajan, et al., filed Nov. 22, 2017, the entire contents of which are incorporated herein by reference.

FIELD

Embodiments described herein relate generally to data processing and more particularly to facilitate age classification of humans based on image depth and human pose.

BACKGROUND

Conventional systems fail to classify adults from children in scenes where human beings of all ages are detected. Although attempts have been made to achieve such classification conventional techniques, most of these techniques are highly dependent on facial features, tend to fail when encountering a lack of clear view (such as occlusion of face, non-frontal face views), seem unable to capture high resolution images of faces, or are simply too intrusive to be acceptable or even ethical.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
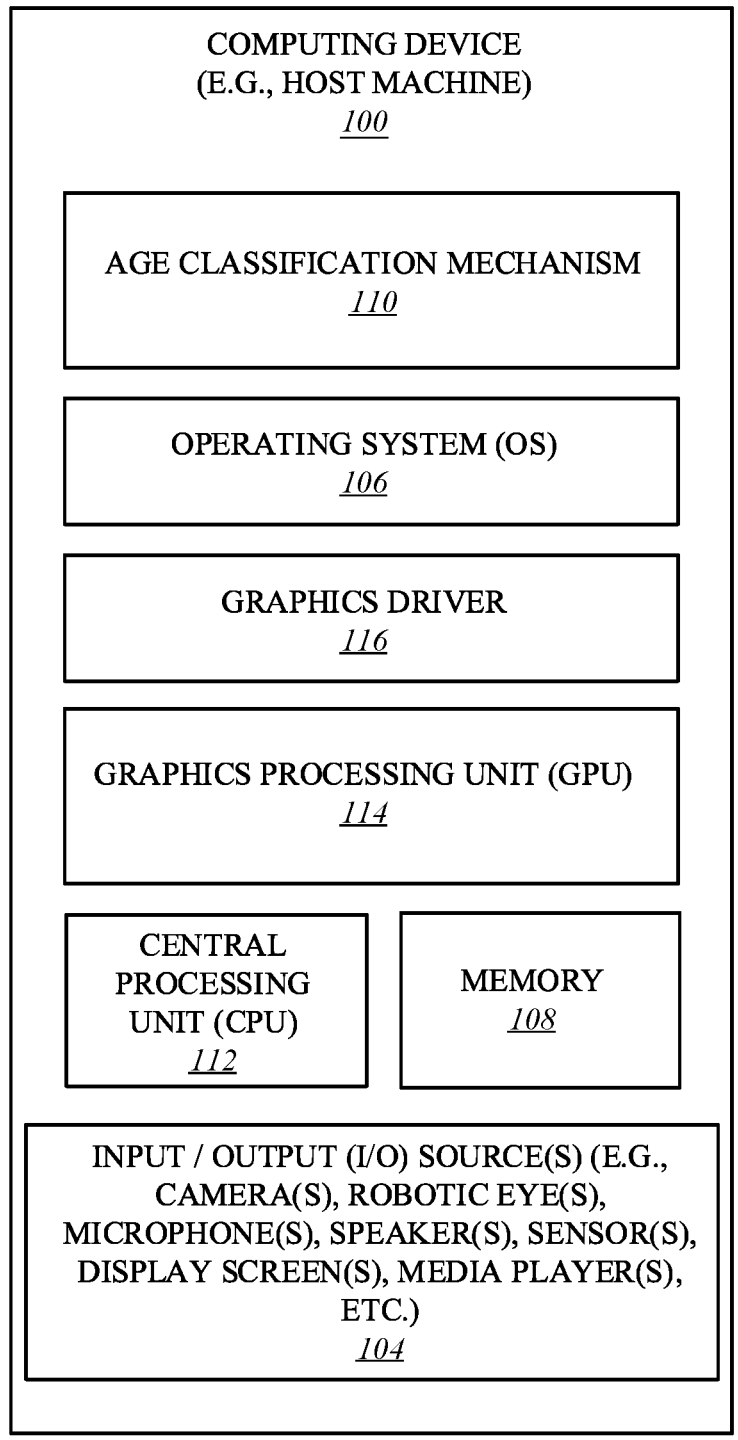
FIG. 1 illustrates a computing device hosting an age classification mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for classification of human beings detected in a scene as adults or children (also referred to as kids), where, for example, such classifications may be used to provide additional safety and security for kids in places like homes, swimming pools, theaters, schools, public parks, shopping malls, sports arenas, etc. Similarly, this novel technique may be extended for any number and type of applications, such as customized digital signage, customer demographic studies in retail stores, home solutions, digital surveillance, autonomous driving, etc., where human analytics based on visual data may be regarded as integral part of these solutions.

Further, for example, since kids have special needs and require additional safety and security than a typical adult, this novel technique may be used to identify and analyze them uniquely such that to provide with additional safety in certain places like swimming pools.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing an age classification mechanism ("age mechanism") 110 according to one embodiment. Computing device 100 represents a communication and data processing device including or representing any number and type of smart devices, such as (without limitation) smart command devices or intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, computing device 100 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of voice-enabled device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, age mechanism 110 may be hosted by operating system 106 in communication with I/O source(s) 104 of computing device 100. In another embodiment, age mechanism 110 may be hosted or facilitated by graphics driver 116. In yet another embodiment, age mechanism 110 may be hosted by or part of graphics processing unit ("GPU" or simply graphics processor") 114 or firmware of graphics processor 114. For example, age mechanism 110 may be embedded in or implemented as part of the processing hardware of graphics processor 114. Similarly, in yet another embodiment, age mechanism 110 may be hosted by or part of central processing unit ("CPU" or simply "application processor") 112. For example, age mechanism 110 may be embedded in or implemented as part of the processing hardware of application processor 112.

In yet another embodiment, age mechanism 110 may be hosted by or part of any number and type of components of computing device 100, such as a portion of age mechanism 110 may be hosted by or part of operating system 116, another portion may be hosted by or part of graphics processor 114, another portion may be hosted by or part of application processor 112, while one or more portions of age mechanism 110 may be hosted by or part of operating system 116 and/or any number and type of devices of computing device 100. It is contemplated that embodiments are not limited to any particular implementation or hosting of age mechanism 110 and that one or more portions or components of age mechanism 110 may be employed or implemented as hardware, software, or any combination thereof, such as firmware.

Voice device 100 may host network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface (s) may include, for example, a wireless network interface having antenna, which may represent one or more antenna (e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
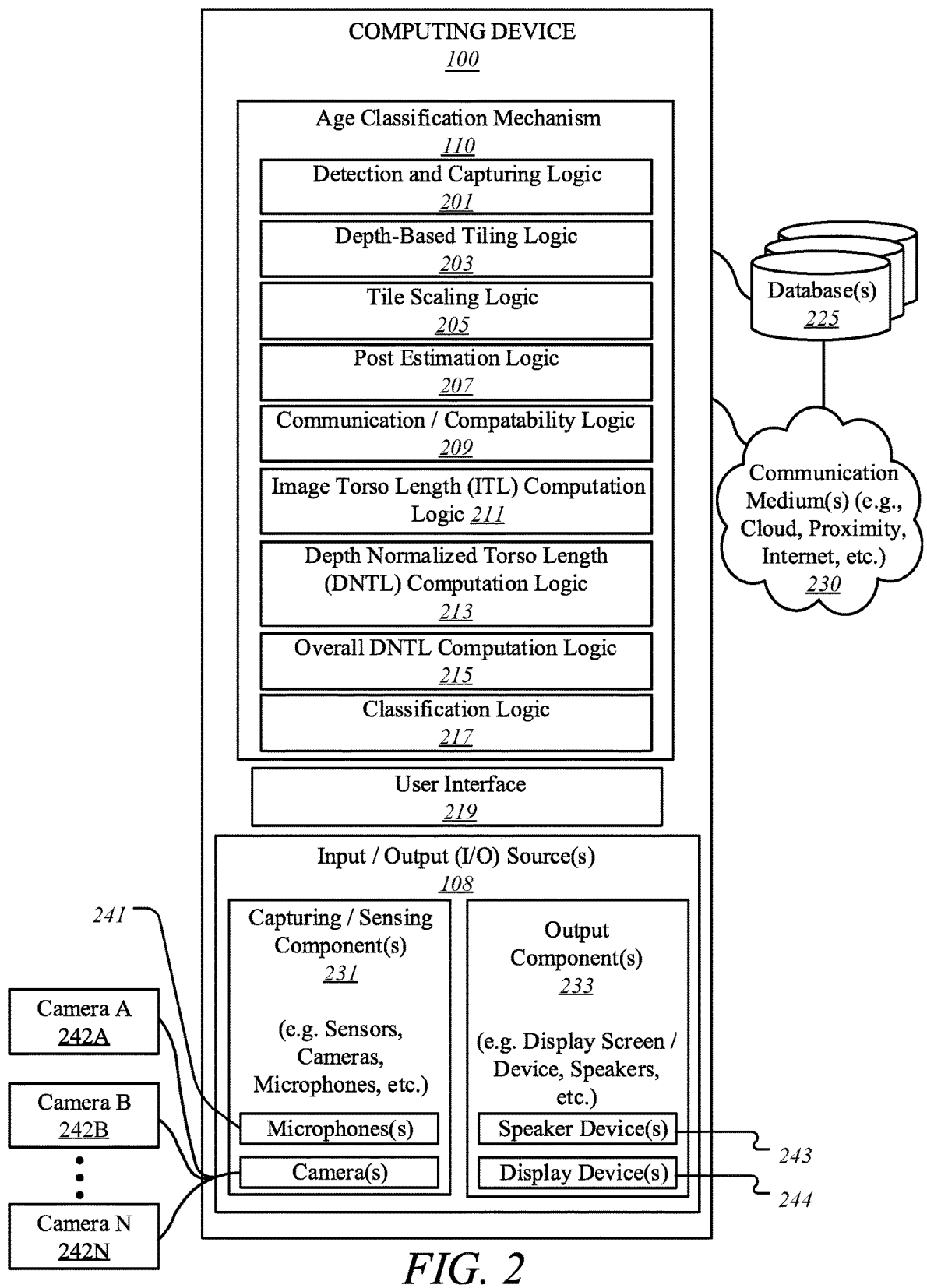
FIG. 2 illustrates the age classification mechanism of FIG. 1 according to one embodiment.

FIG. 2 illustrates age classification mechanism 110 of FIG. 1 according to one embodiment. For brevity, many of the details already discussed with reference to FIG. 1 are not repeated or discussed hereafter. In one embodiment, age mechanism 110 may include any number and type of components, such as (without limitations): detection and capturing logic 201; depth-based tiling logic ("tiling logic") 203; tile scaling logic 205; pose estimation logic 207; communication/compatibility logic 209; image torso length (ITL) computation logic 211; depth normalized torso length (DNTL) computation logic 213; overall DNTL computation logic 215; and classification logic 217.

Computing device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having capturing/sensing component(s) 231, such as camera(s) A 242A, B 242B, N 242N (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s) 243, etc.

Computing device 100 is further illustrated as having access to and/or being in communication with one or more database(s) 225 and/or one or more of other computing devices over one or more communication medium(s) 230 (e.g., networks such as a cloud network, a proximity network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including capturing/sensing component(s) 231 and output component(s) 233. In one embodiment, capturing/sensing component(s) 231 may include a sensor array including, but not limited to, microphone(s) 241 (e.g., ultrasound microphones), camera(s) 242A, 242B, 242N (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of speaker(s) 243, display device(s) 244 (e.g., screens, projectors, light-emitting diodes (LEDs)), and/or vibration motors, etc.

For example, as illustrated, capturing/sensing component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242A, 242B, 242N serve as one or more input devices for detecting and capturing of image and/or videos of scenes, objects, etc., and provide the captured data as video inputs into voice-enabled device 100.

It is contemplated that embodiments are not limited to any number or type of microphone(s) 241, camera(s) 242A, 242B, 242N, speaker(s) 243, display(s) 244, etc. For example, as facilitated by detection and capturing logic 201, one or more of microphone(s) 241 may be used to detect speech or sound simultaneously from multiple users or speakers, such as speaker 250. Similarly, as facilitated by detection and capturing logic 201, one or more of camera(s) 242A, 242B, 242N may be used to capture images or videos of a geographic location (such as a room) and its contents (e.g., furniture, electronic devices, humans, animals, plats, etc.) and form a set of images or a video stream form the captured data for further processing by age mechanism 110 at computing device 100.

Similarly, as illustrated, output component(s) 233 may include any number and type of speaker(s) 243 to serve as output devices for outputting or giving out audio from voice device 100 for any number or type of reasons, such as human hearing or consumption. For example, speaker(s) 243 work the opposite of microphone(s) 241 where speaker(s) 243 convert electric signals into sound.

In some embodiments, computing device 100 may be placed within or part of a geographic area or, in another embodiment, remote or far away from the geographic area, such as a swimming pool, a park, a home, a zoo, a theater, a room, a building, a hall, a stadium, etc., and, but camera(s) 242A, 242B, 242N, which may be embedded in or in communication with computing device 100, are capable of capturing a scene of the geographic area having people (such as adults and/or kids) based on the locations and movements of camera(s) 242A, 242B, 242N and their proximity to the people in the scene.

As previously described, several attempts have been made to achieve classification, but all conventional techniques have failed for one reason or another. For example, human face-based approaches extract hand-engineered or deep learning-based features from a human face and attempt to classify it, but they fail for any number of reasons, such as when the frontal part of the face is occluded, cameras are distant, constrained conditions have occurred, and/or the like.

Similarly, body-part ratio-based approaches are known for exploiting differences in face length and body weights for classification purposes. However, this conventional technique also fails in scenes containing people with non-standing postures, such as sitting or crouching, or even when there is non-uniform scaling due to surveillance camera viewpoints.

More recently, biometric approaches have been introduced, such as allowing forced expiratory spirometry to use a set of vital metabolic measurements for classification purpose. However, these biometric conventional techniques are intrusive (such as the use of sensors on the human body) and fail to operate in a seamless manner on any arbitrary person which essentially makes such techniques unusable and inapplicable.

It is well known that adults and kids differ in their body dimensions; particularly, with respect to their torso length, where a torso length may be regarded as the difference between the neck and the center of the left and right hips of a person. Further, an adult torso (length) is generally higher than that of a child, where the neck and hips are located through a human pose-estimation algorithm as facilitated by pose estimation logic 207.

In one embodiment, detection and capturing logic 201 may facilitate one or more camera, such as camera A 242A, camera B 242B, and camera N 242N to capture images (such as video or still images) of a scene (such as at a park or a swimming pool) having human beings including adults and kids. These images may then be used to detect humans in the scene as facilitated by detection and capturing logic 201. Now, for example, due to the perspective projection of the scene on an image plane of camera(s) 242, a kid standing close to camera(s) 242 and an adult standing far away from camera(s) 242 may appear to have the same torso length measured in image pixels. In one embodiment, this conundrum may be resolved by simply normalizing the image torso length by using the typical depth known of a human torso as captured from the center of camera(a) 242, while this DNTL may then be used for classification.

In one embodiment, as illustrated, cameras 242A, 242B, 242N may be installed in various locations and be in communication with computing device 100 and detection and capturing logic 201, while, in another embodiment, cameras 242A, 242B, 242C may be embedded in computing device 100. Further, it is contemplated that embodiments are not limited to any number or type of cameras and that three cameras 242A, 242B, 242C illustrated here are merely provided as an example for brevity, clarity, and ease of understanding.

In one embodiment, torso length is used for age classification since, for example, unlike facial features, the projected torso length of a person at a given depth remain unaffected by body movements or human sentiments, etc., as far as the torso remains in a plane parallel to the image plane of one or more of cameras 242A, 242B, 242C to avoid what is regarded as foreshortening of body parts, such as limbs, torso, etc. For example, foreshortening is a process by which certain body parts appear disproportionately shorter compared to other body parts when projected on the image plane of one or more of cameras 242A, 242B, 242C. A foreshortened torso may be unsuitable for estimating the real torso length of the torso the foreshortened torso represents.

As will be further described in this document, embodiments provide for capturing of true torso length based on the images captured by one or more of cameras 242A, 242B, 242C and as facilitated by one or more components of age mechanism 110. For example, as illustrated with respect to FIG. 3A, a set of three cameras A 242A, B 242B, and N 242N may be placed at various locations and equal distances from the center of a human body, such as image planes 312A, 312B, and 312N corresponding to cameras 242A, 242B, and 242N, respectively, are indicated with respect to projection 301.

In some embodiments, a camera system may be employed having an area under observation covered by multiple camera, such as cameras 242A-242N, with significant overlap. Further, it is contemplated that a person may be detected by more than just one camera, such as by any combination of two or more of cameras 242A-242N. Further, for example, identical persons may be located from multiple camera views such that local depths (from each camera) and global depths (from a reference point) may be calculated. Since a single person may be detected by more than just one of cameras 242A-242N, it is contemplated that correspondingly, more than one torso length values may exist for that person as viewed through those cameras of cameras 242A-242N. Although torso length may be used as a feature to determine the age of persons, such as whether they are adult or kids, it is contemplated that in some embodiments, torso length may also be used for robustly compute other dimensions of humans across various poses, actions, and/or the like.

Figure 3A:
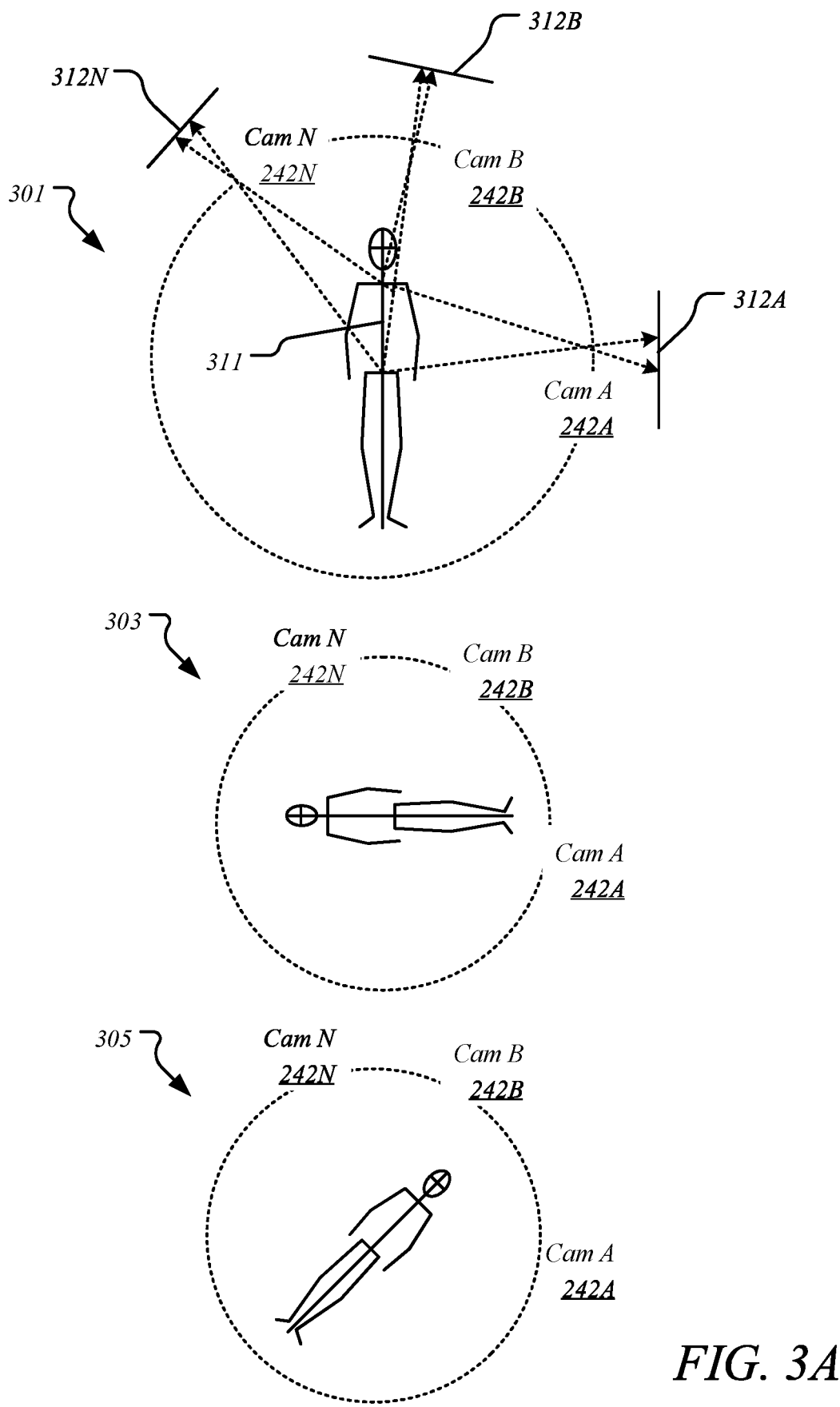
FIG. 3A illustrates torso foreshortening in multiple views according to one embodiment.

As seen in FIG. 3A, with respect to projection 301, the torso length of human torso 311 being projected on image planes 312A, 312B, and 312N may depend upon the relative orientation of torso 311 with image planes 312A, 312B, and 312N of cameras 242A, 242B, and 242N, respectively. Since, in this illustrated embodiment of FIG. 3A, torso 311 is shown as located in plane 312A that is parallel to camera 242A, its projected length is maximum with respect to camera 242A. This is the case of minimal foreshortening.

On the other hand, with regard to projection 303, since torso 311 is nearly perpendicular to image plane 312B of camera 242B, the projected torso length in this case may be subject to minimum or maximum foreshortening. When the orientation of the person changes as shown in projections 303 and 305, the projected torso length also changes across cameras 242B, 242N. Similarly, the maximum projected torso length happens in case of camera 242B and camera 242N.

Further, when human postures change arbitrarily, torso foreshortening effects are determined to be minimum when torso 311 is imaged on to camera A 242A whose image plane 312A is parallel to torso 311. By placing a number of cameras 242A, 242B, 242N around a scene, this condition may be achieved to a large extent in at least one of the camera views (such as the best view) for every person in the scene. For example, for the best view, the projected torso length in image planes 312A, 312B, 312N of cameras 242A, 242B, 242N is maximum where the foreshortening is minimum.

Figure 3B:
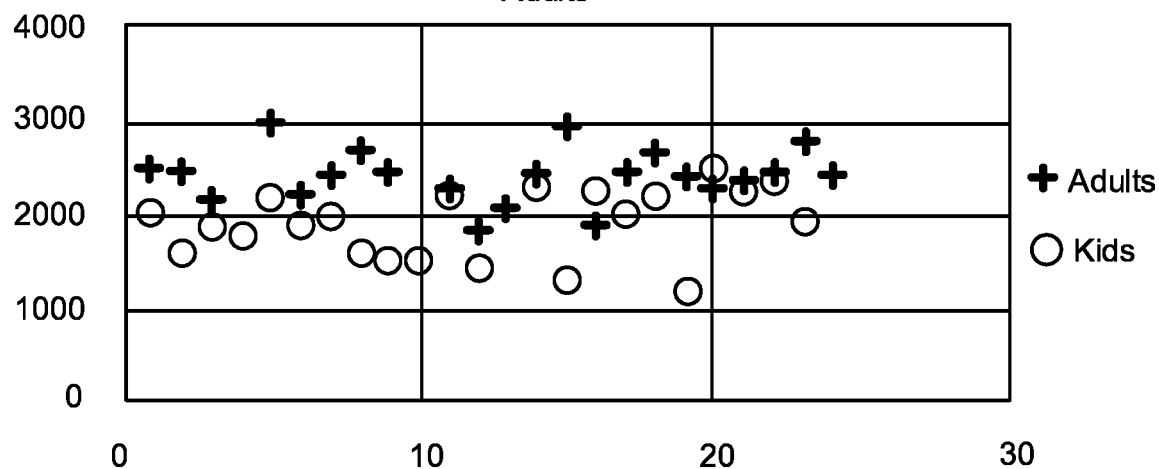
FIG. 3B illustrates a graph showing Depth Normalized Torso Length of kids and adults in a scene obtained using single view cameras according to one embodiment.

For example, in a real-world scenario, since cameras 242A, 242B, 242N need not be equidistant from a person, the measured torso length is needed to be normalized by the depth of the human before comparing across views. When the image torso length (in pixels) is normalized by the depth of the person from the center of one or more cameras 242A, 242B, 242N, then the resulting DNTL can be used an effective and a robust feature for classifying kids and adults as illustrated in graph 320 of FIG. 3B. As illustrated in FIG. 3B, the DNTL obtained from a single view for about 24 kids and adults as shown on graph 320, where better results may be obtained by using multiple cameras, such as cameras 242A, 242B, 242N, to minimize the effect for foreshortening.

Figure 3C:
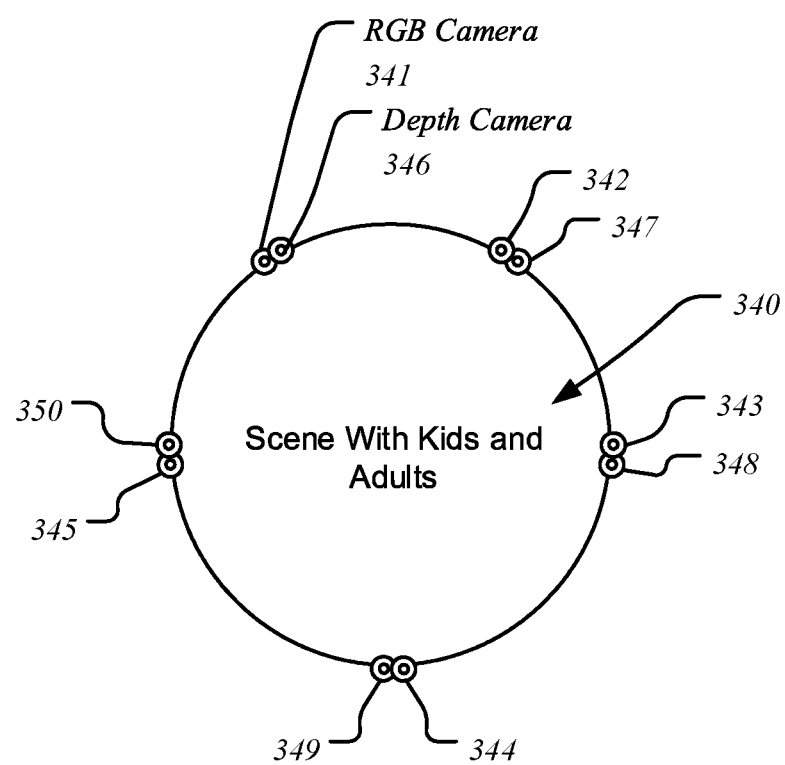
FIG. 3C illustrates a top view of a scene containing adults and kids as viewed by multiple pairs of red green blue cameras and depth cameras according to one embodiment.

In some embodiments, cameras 242A, 242B, 242N may include one or more of depth cameras, red green blue (RGB) cameras, etc., for observing and capturing images of a scene containing kids and adults as illustrated with respect to FIG. 3C, where scene 340 is a top view containing adults and kids, collectively p, as viewed by multiple pairs, J, of RGB cameras 341, 342, 343, 344, 345 and depth cameras 346, 347, 348, 349, 350 of cameras 242A, 242B, 242N. For example, depth may be obtained from active depth cameras 346, 347, 348, 349, 350, such as Intel® RealSense™, Asus® Xtion™, or through stereoscopic cameras in each view. A sparse depth-map of the feature points in each person may also be obtained through first established multi-view correspondences and then using triangulation and bundle adjustment.

Now referring back to age mechanism 110, in one embodiment, once a video stream of a scene is captured by one or more of cameras 242A, 242B, 242N, detection and capturing logic 201 may then be used to detect all the humans in the scene by applying one or more detection techniques, such as pedestrian/person detection technique, face detection technique, etc., on the RGB video stream captured by one or more cameras 242A, 242B, 242N. For example, face detection may be useful in cases where the entire body of a person may not be visible or in matters of abnormal postures.

Once the humans, both adults and kids, are detected or located in the RGB video stream, in one embodiment, tiling logic 203 may then be triggered for performing depth-based RGB tiling where the depth of each human from the center of each of cameras 242A, 242B, 242N is approximated as the average depth value of pixels falling within a corresponding box region in the depth video stream. Further, based on depth values and spatial proximity of the human bounding boxes, they are clustered together as RGB tiles as facilitated by tiling logic 203.

In one embodiment, tile scaling logic 205 may then be triggered to use a deep learning-based pose estimation technique to use a deep neural network (DNN), such as a convolutional neural network (CNN) for part detection and generation of a graphical model for part assignment. The efficiency of part detection may be useful when the test image is brought to the same scale as that of training images, where each depth tile is scaled by an appropriate amount to achieve this goal as facilitated by tile scaling logic 205.

Further, in one embodiment, pose estimation logic 207 may then be triggered to perform a human two-dimensional (2D) pose estimation for determining pixel locations of various body parts of different individuals in the scene. For example, post estimation logic 207 may be used to detect up any number and type of body parts, such as 14 body parts including head, neck, shoulders, hips, etc., of each person, including adults and kids.

In one embodiment, ITL computation logic 211 may then be triggered to compute torso length, $L_{p,j}$, of each person, p, in the $j^{th}$ view, as the distance between the neck and the hip center as follows:

$$L_{p,j} = \sqrt{(N_x - H_x)^2 + (N_y - H_y)^2}$$

Where $(N_x, N_y)$ refers to pixel co-ordinates of the neck, while $(H_x, H_y)$ refers to pixel co-ordinates of the hip center. This is further illustrated with reference to FIG. 3D, where a person's image-based model 360 shows computed image torso length 361, $L_{p,j}$, hip center 363, $(H_x, H_y)$, and neck position 365, $(N_x, N_y)$.

As mentioned above, for example, a kid standing close to a camera, such as camera 242A, and an adult standing away from the same camera 242A may seem to have the same torso length, $L_{p,j}$, due to the perspective projection of camera 242A. To get the real length of the torso, $L_{p,j}$ so that it is normalized with the corresponding depth as shown in graph 370 of FIG. 3E, DNTL computation logic 213 is triggered to use similarity of triangles CPO 371 and CQM 373 to compute the depth normalized torso length, $L_{norm,p,j}$, as follows:

$$L_{norm,p,j} = D_{p,j} * L_{p,j}$$

Where $D_{p,j}$ refers to the depth of the $p^{th}$ human inferred from the depth map in the $j^{th}$ view.

In one embodiment, overall DNTL computation logic 215 may be used to establish correspondence between people in multiple views, where suppose the $p^{th}$ person is located in a subset of k views amongst a total of J views, then the overall DNTL, $L_{norm,p}$ may be computed as the maximum of the DNTLs in those k views in which the considered person is present, as follows:

$$L_{norm,p} = \max_k (L_{norm,p,k})$$

Further, in one embodiment, classification logic 217 may be triggered to use $L_{norm,p}$ to classify each person in the scene as an adult or a kid as follows:

$$Person_p = \begin{cases} \text{kid} & L_{norm,p} < T \\ \text{Adult} & \text{Otherwise} \end{cases}$$

Where, the threshold, T, depends on the camera resolution and depth metrics of one or more of cameras 242A, 242B, 242N.

As discussed above and throughout this document, age mechanism 110 provides for a novel technique for using human torso length as the invariant feature for characterizing and differentiating between adults and kids, such as the use of human torso length and the depth for achieving adult-kid classification. Further, the novel technique uses human pose estimation and depth sensors to facilitate the adult-kid classification such that persons are first located through a face or person detection and then clustered into spatially contiguous depth tiles for scale-invariant deep learning-based human pose estimation.

Capturing/sensing component(s) 231 may further include any number and type of camera(s) 242A, 242B, 242N, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinemagraphs, etc. Similarly, for example, displays may include any number and type of displays, such as integral displays, tensor displays, stereoscopic displays, etc., including (but not limited to) embedded or connected display screens, display devices, projectors, etc.

Capturing/sensing component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing component(s) 231 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing component(s) 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Capturing/sensing component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any particular number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "adults", "kids", "adults-kids classification", "depth", "RGB", "person detection", "depth-based RGB tiling", "RGB tile scaling", "human 2D pose", "image torso length", "ITL", "depth normalized torso length", "DNTL", "overall DNTL", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from age mechanism 110 to facilitate various embodiments including adding, removing, and/or enhancing certain features. For brevity, clarity, and ease of understanding of age mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 3A illustrates torso foreshortening in multiple views according to one embodiment and as previously described with reference to FIG. 2. For brevity, many of the details previously discussed with reference to FIGS. 1-2 may not be discussed or repeated hereafter.

FIG. 3B illustrates a graph 320 showing DNTL of kids and adults in a scene obtained using single view cameras according to one embodiment and as previously described with reference to FIG. 2. For brevity, many of the details previously discussed with reference to FIGS. 1-3A may not be discussed or repeated hereafter.

FIG. 3C illustrates a top view of a scene 340 containing adults and kids as viewed by multiple pairs of RGB cameras 341, 342, 343, 344, 345 and depth cameras 346, 347, 348, 349, 350 according to one embodiment and as previously described with reference to FIG. 2. For brevity, many of the details previously discussed with reference to FIGS. 1-3B may not be discussed or repeated hereafter.

Figure 3D:
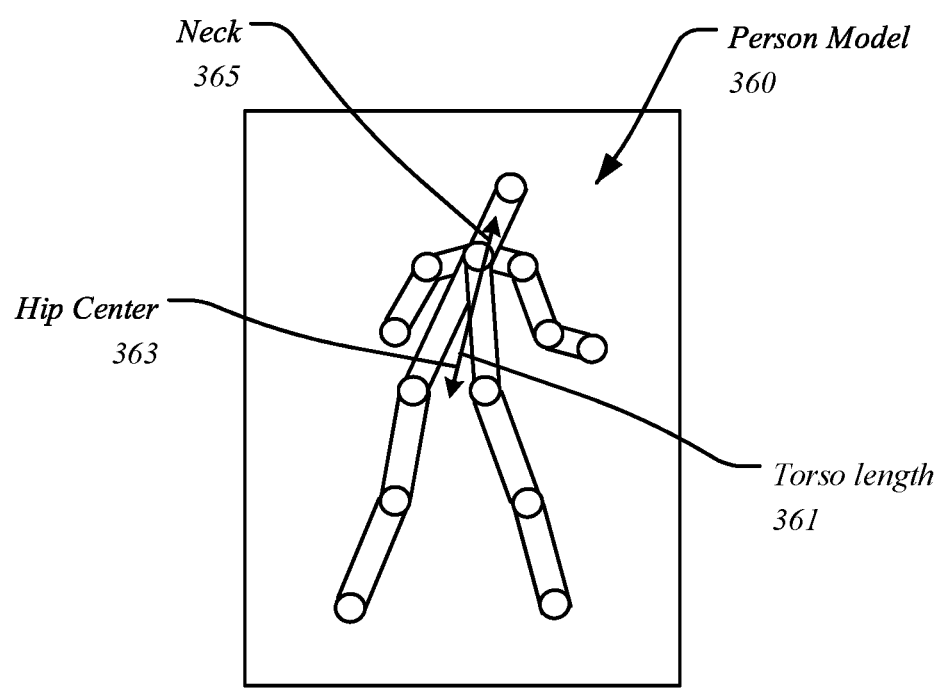
FIG. 3D illustrates torso length, neck, and hip center on a model according to one embodiment.

FIG. 3D illustrates torso length 361, neck 365, and hip center 363 on a model 360 according to one embodiment and as previously described with reference to FIG. 2. For brevity, many of the details previously discussed with reference to FIGS. 1-3C may not be discussed or repeated hereafter.

Figure 3E:
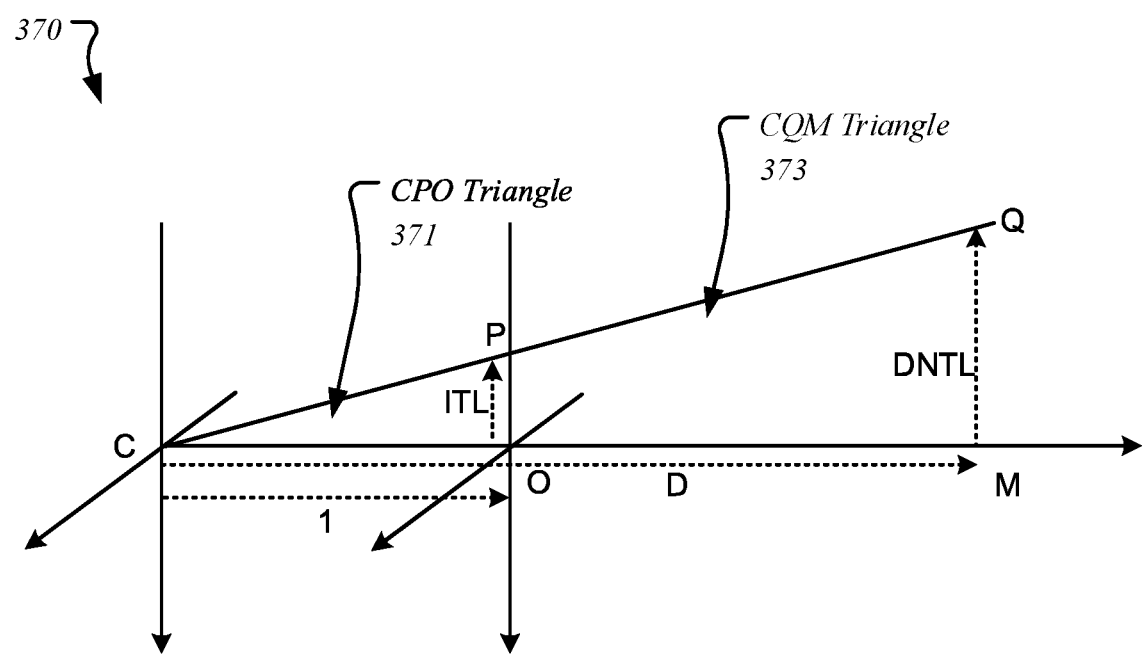
FIG. 3E illustrates a graph showing a camera-based Depth Normalized Torso Length computation using Image Torso Length and depth according to one embodiment.

FIG. 3E illustrates a graph 370 showing a camera-based DNTL computation using ITL and depth according to one embodiment and as previously described with reference to FIG. 2. For brevity, many of the details previously discussed with reference to FIGS. 1-3D may not be discussed or repeated hereafter.

Figure 3F:
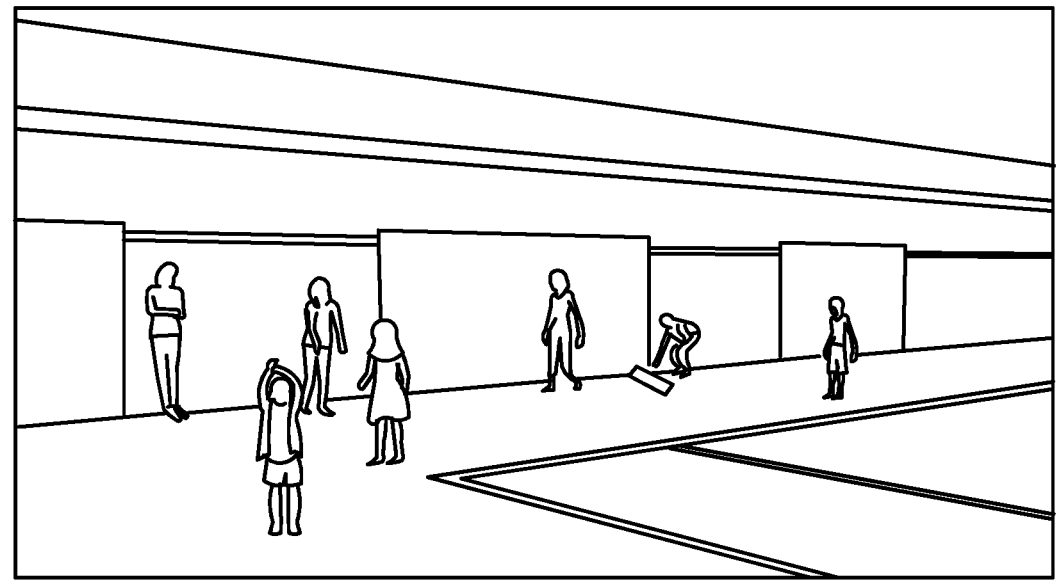
FIG. 3F illustrates an unclassified scene and a classified scene according to one embodiment.
Figure 3F:
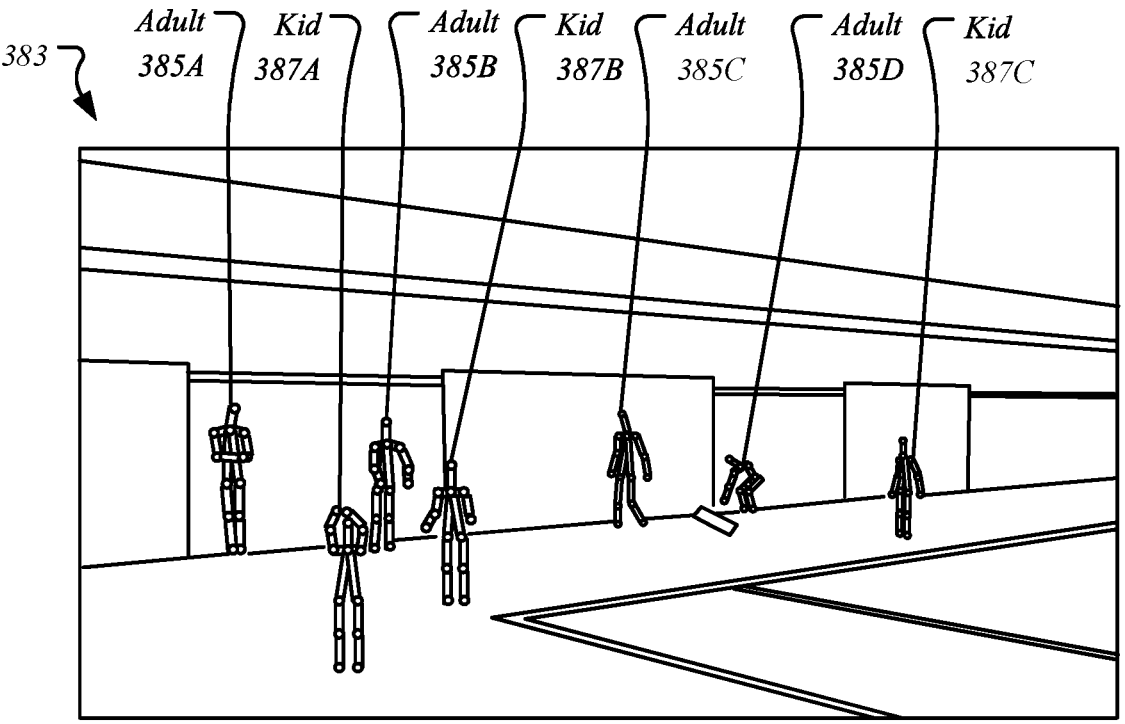

FIG. 3F illustrates an unclassified scene 381 and a classified scene 383 according to one embodiment. For brevity, many of the details previously discussed with reference to FIGS. 1-3E may not be discussed or repeated hereafter. As illustrated, unclassified scene 381 represents a raw scene as captured by one or more cameras, such as cameras 242A, 242B, 242N of FIG. 2, where unclassified scene 381 is shown to have persons of different ages, such as adults and children, but they are not yet classified as such.

In one embodiment, using age mechanism 110 of FIG. 2, unclassified scene 381 is processed into classified scene 383 such that persons shown in unclassified scene 381 are now classified as adults 385A, 385B, 385C, 385D or kids 387A, 387B, 387C as discussed with reference to FIG. 2. As illustrated, unclassified scene 381 shows a swimming pool and an area around the swimming pool having individuals of varying ages, ranging from kids to adults. Further, in the illustrated embodiment, age mechanism 110 and its components and processes as described with respect to FIG. 2 may be triggered to convert unclassified scene 381 into classified scene 383 by using, in one embodiment, human-pose (overlying on people) and depth such that classified scene 383 identifies each person either as an adult 385A, 385B, 385C, 385D or a kid 387A, 387B, 387C.

The application of the novel technique on a swimming pool video frame as shown in scenes 381, 383, as facilitated by age mechanism 110 of FIG. 2, allows for a clear distinction between the originally captured unclassified scene 381 and the pose and classification results-based classification scene 383. It is contemplated that in some embodiments, better results may be obtained by altering the number and type of some of the components, such as using multi-view cameras as opposed to single-view cameras.

Further, since there are gender-based differences in the average height of males and females, a gender-based threshold may be used for obtaining better results, such as by using a robust gender recognition technique over a wide range of arbitrary poses such that two threshold values including one for male torso lengths and one for female torso lengths may be set and applied to further improve the accuracy of adult-kid classification.

It is further contemplated that various countries, states, regions, territories, cities, etc., may have different age requirements for adults or unsupervised minor and thus, embodiments are not limited to any age or age range for classification purposes. For example, 14 years is the acceptable required age to classify unsupervised minors in most states in the United States; however, embodiments are not limited as such and this age could be changed to another age, such as 13 or 16 or 18, etc., or age range, such as 1-10 years for supervised young children, 10-14 years for supervised older children, 14 years and above for unsupervised children and adults, and/or the like.

Figure 4:
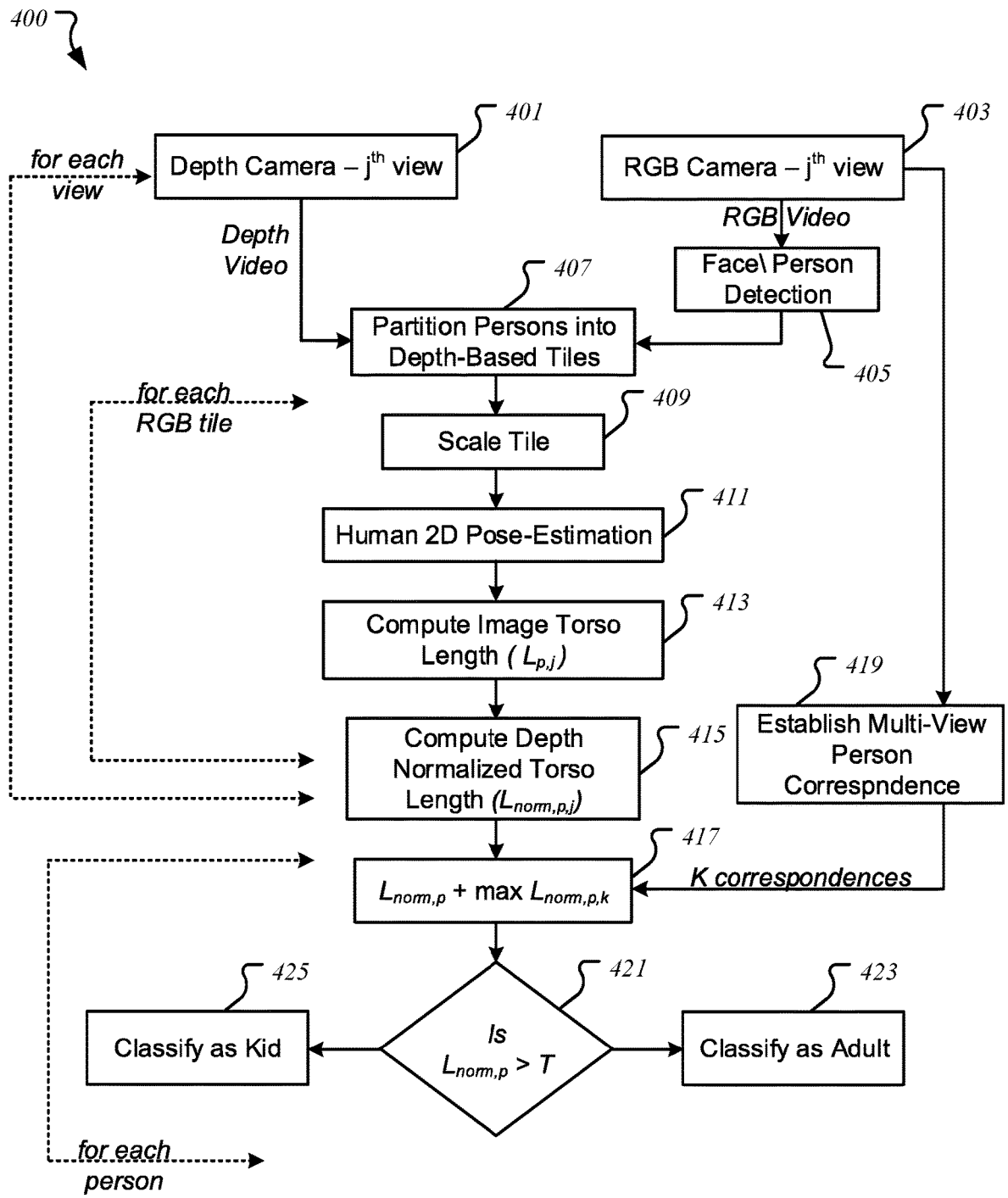
FIG. 4 illustrates a method for classification of adults and kids according to one embodiment.

FIG. 4 illustrates a method 400 for classification of adults and kids according to one embodiment. For brevity, many of the details previously discussed with reference to FIGS. 1-3F may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by age mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

Method 400 starts at blocks 401 and 403 with inputs from depth camera and RGB camera, respectively. At block 405, the RGB video/image input is further used for detection of persons. Further, RGB video is used for estimating multi-view person correspondence at block 419. Both the depth video and the person/facial detection information obtained from the RGB video are used for partitioning of person into depth-based tiles at block 407. In one embodiment, scaling of the depth-based tiles is performed at block 409, while subsequently, human 2D pose estimation is performed at block 411.

In some embodiments, a camera system may be employed having an area under observation covered by multiple cameras with significant overlap. Further, it is contemplated that a person may be detected by more than just one camera, such as by any combination of two or more of cameras. Further, for example, identical persons may be located from multiple camera views such that local depths (from each camera) and global depths (from a reference point) may be calculated. Since a single person may be detected by more than just one camera, it is contemplated that correspondingly, more than one torso length values may exist for that person as viewed through those cameras. Although torso length may be used as a feature to determine the age of persons, such as whether they are adult or kids, it is contemplated that in some embodiments, torso length may also be used for robustly compute other dimensions of humans across various poses, actions, and/or the like.

In one embodiment, at block 413, image torso length is computed using the human 2D pose estimation, while at block 415, depth normalized torso length is computed. At block 417, in one embodiment, for each person in the scene, an overall DNTL is computed based on the computed DNTL and estimated multi-view person correspondence. At block 421, a decision is made as to whether the overall DNTL is greater than or less than a predetermined threshold value, T, where this threshold may be a number or a value that equals to or corresponds to the legal or acceptable age for adults/kids or requirement for supervised/unsupervised kids, such as 14 years being the legal and acceptable age for unsupervised kids, while 18 years being the legal age for adults in most states in the United States and most countries around the world.

If the overall DNTL is determined to be greater than the threshold value, the person is classified as an adult at block 423, while if the overall DNTL is determined to be equal to or less than the threshold value, then the person is classified as a kid at block 425. As further illustrated, certain processes, such as from block 401 through block 415 and block 419, may be performed for each view or scene. Similarly, processes ranging from block 409 to 415 and block 419 may be performed for each RGB tile, while processes of blocks 417-425 may be performed for each person in the scene.

Figure 5:
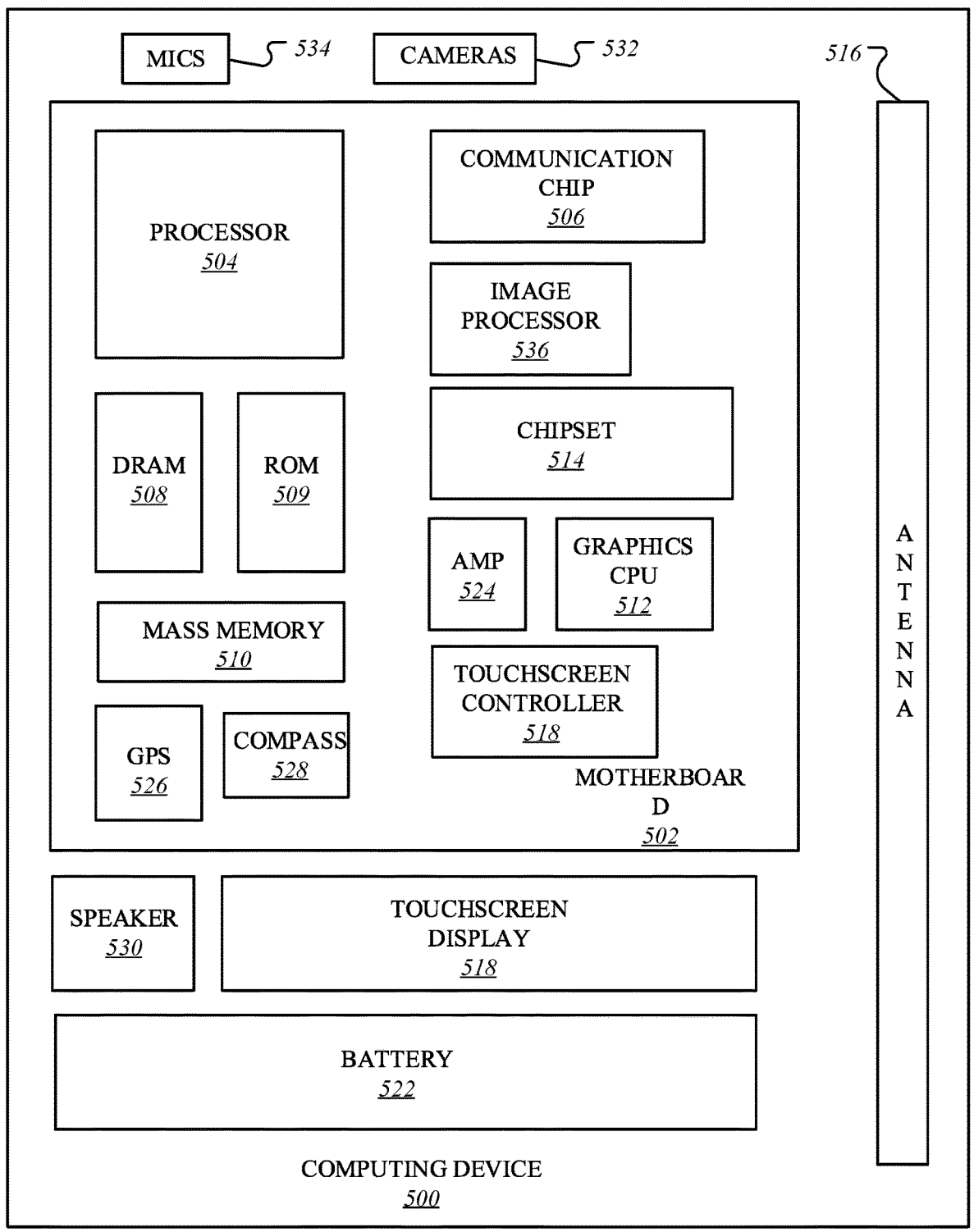
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
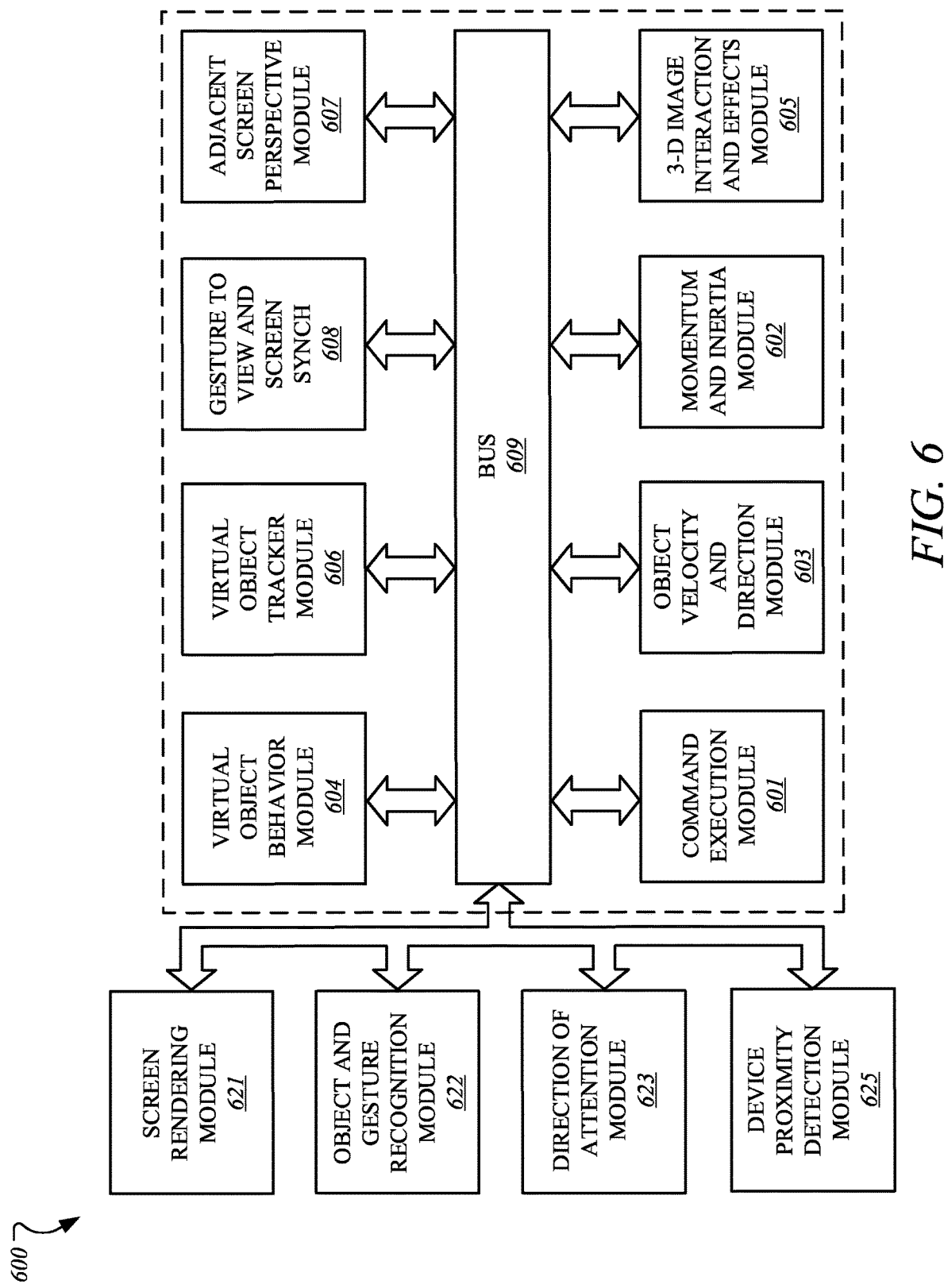
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622.

For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate age classification of humans using image depth and human pose, the apparatus comprising: detection and capturing logic to facilitate one or more cameras to capture a video stream of a scene having persons; overall depth normalized torso length (overall DNTL) computation logic to compute overall-depth torso lengths of the persons based on depth torso lengths of the persons, wherein the overall DNTL computation logic is further to compare the overall-depth torso lengths with a predetermined threshold value representing a separation age between adults and children; and classification logic to classify a first set of the persons as adults if a first set of the overall-depth torso lengths associated with the first set of persons is greater than the threshold value.

Example 2 includes the subject matter of Example 1, wherein the classification logic is further to classify a second set of the persons as children if a second set of the overall-depth torso lengths associated with the second set of persons is equal to or less than the threshold value.

Example 3 includes the subject matter of Examples 1-2, further comprising depth-based tiling logic to approximate depth values of the persons and partition the persons into depth-based tiles using the depth values, wherein the detection and capturing logic is further to detect the persons in the scene.

Example 4 includes the subject matter of Examples 1-3, further comprising: tile scaling logic to facilitate a deep neural network to scale the depth-based tiles, where scaling of the depth-based tiles includes red green blue (RGB) tile scaling; and pose estimation logic to locate pixel locations of one or more body parts of each person to detect placement and length of each of the one or more body parts, wherein the one or more body parts include one or more of heads, necks, shoulders, and hips.

Example 5 includes the subject matter of Examples 1-4, further comprising image torso length (ITL) computation logic to compute image torso length of the persons, wherein an image torso length of a person represents a distance between a neck and a hip center of the person.

Example 6 includes the subject matter of Examples 1-5, further comprising DNTL computation logic to convert the image torso lengths into the depth torso lengths of the persons based on normalized depths associated with the persons, wherein a depth torso length represents a real torso length, and wherein each normalized depth is inferred from a position of each person with respect to the one or more cameras.

Example 7 includes the subject matter of Examples 1-6, wherein the apparatus comprises one or more processors including a graphics processor co-located with an application processor on a common semiconductor package.

Some embodiments pertain to Example 8 that includes a method facilitating age classification of humans using image depth and human pose, the method comprising: facilitating, by one or more cameras of a computing device, capturing of a video stream of a scene having persons; computing overall-depth torso lengths of the persons based on depth torso lengths of the persons; comparing the overall-depth torso lengths with a predetermined threshold value representing a separation age between adults and children; and classifying a first set of the persons as adults if a first set of the overall-depth torso lengths associated with the first set of persons is greater than the threshold value.

Example 9 includes the subject matter of Example 8, further comprising classifying a second set of the persons as children if a second set of the overall-depth torso lengths associated with the second set of persons is equal to or less than the threshold value.

Example 10 includes the subject matter of Examples 8-9, further comprising: approximating depth values of the persons and partition the persons into depth-based tiles using the depth values; and detecting the persons in the scene.

Example 11 includes the subject matter of Examples 8-10, further comprising: facilitating a deep neural network to scale the depth-based tiles, where scaling of the depth-based tiles includes red green blue (RGB) tile scaling; and locating pixel locations of one or more body parts of each person to detect placement and length of each of the one or more body parts, wherein the one or more body parts include one or more of heads, necks, shoulders, and hips.

Example 12 includes the subject matter of Examples 8-11, further comprising computing image torso length of the persons, wherein an image torso length of a person represents a distance between a neck and a hip center of the person.

Example 13 includes the subject matter of Examples 8-12, further comprising converting the image torso lengths into the depth torso lengths of the persons based on normalized depths associated with the persons, wherein a depth torso length represents a real torso length, and wherein each normalized depth is inferred from a position of each person with respect to the one or more cameras.

Example 14 includes the subject matter of Examples 8-13, wherein the computing device comprises one or more processors including a graphics processor co-located with an application processor on a common semiconductor package.

Some embodiments pertain to Example 15 that includes a data processing system having a processing device coupled to a memory device, the data processing system having a camera system including one or more cameras to capture a video stream of a scene having persons, and the processing device to perform operations comprising: facilitating, by one or more cameras of a computing device, capturing a video stream of a scene having persons; computing overall-depth torso lengths of the persons based on depth torso lengths of the persons; comparing the overall-depth torso lengths with a predetermined threshold value representing a separation age between adults and children; and classifying a first set of the persons as adults if a first set of the overall-depth torso lengths associated with the first set of persons is greater than the threshold value.

Example 16 includes the subject matter of Example 15, further comprising classifying a second set of the persons as children if a second set of the overall-depth torso lengths associated with the second set of persons is equal to or less than the threshold value.

Example 17 includes the subject matter of Examples 15-16, further comprising: approximating depth values of the persons and partition the persons into depth-based tiles using the depth values; and detecting the persons in the scene.

Example 18 includes the subject matter of Examples 15-17, further comprising: facilitating a deep neural network to scale the depth-based tiles, where scaling of the depth-based tiles includes red green blue (RGB) tile scaling; and locating pixel locations of one or more body parts of each person to detect placement and length of each of the one or more body parts, wherein the one or more body parts include one or more of heads, necks, shoulders, and hips.

Example 19 includes the subject matter of Examples 15-18, further comprising computing image torso length of the persons, wherein an image torso length of a person represents a distance between a neck and a hip center of the person.

Example 20 includes the subject matter of Examples 15-19, further comprising converting the image torso lengths into the depth torso lengths of the persons based on normalized depths associated with the persons, wherein a depth torso length represents a real torso length, and wherein each normalized depth is inferred from a position of each person with respect to the one or more cameras.

Example 21 includes the subject matter of Examples 15-20, wherein the computing device comprises one or more processors including a graphics processor co-located with an application processor on a common semiconductor package.

Some embodiments pertain to Example 22 that includes an apparatus to facilitate simultaneous recognition and processing of multiple speeches from multiple users, the apparatus comprising: means for facilitating, by one or more cameras, capturing of a video stream of a scene having persons; means for computing overall-depth torso lengths of the persons based on depth torso lengths of the persons; means for comparing the overall-depth torso lengths with a predetermined threshold value representing a separation age between adults and children; and means for classifying a first set of the persons as adults if a first set of the overall-depth torso lengths associated with the first set of persons is greater than the threshold value.

Example 23 includes the subject matter of Example 22, further comprising means for classifying a second set of the persons as children if a second set of the overall-depth torso lengths associated with the second set of persons is equal to or less than the threshold value.

Example 24 includes the subject matter of Examples 22-23, further comprising: means for approximating depth values of the persons and partition the persons into depth-based tiles using the depth values; and detecting the persons in the scene.

Example 25 includes the subject matter of Examples 22-24, further comprising: means for facilitating a deep neural network to scale the depth-based tiles, where scaling of the depth-based tiles includes red green blue (RGB) tile scaling; and means for locating pixel locations of one or more body parts of each person to detect placement and length of each of the one or more body parts, wherein the one or more body parts include one or more of heads, necks, shoulders, and hips.

Example 26 includes the subject matter of Examples 22-25, further comprising means for computing image torso length of the persons, wherein an image torso length of a person represents a distance between a neck and a hip center of the person.

Example 27 includes the subject matter of Examples 22-26, further comprising means for converting the image torso lengths into the depth torso lengths of the persons based on normalized depths associated with the persons, wherein a depth torso length represents a real torso length, and wherein each normalized depth is inferred from a position of each person with respect to the one or more cameras.

Example 28 includes the subject matter of Examples 22-27, wherein the apparatus comprises one or more processors including a graphics processor co-located with an application processor on a common semiconductor package.

Example 28 includes the subject matter of Examples 22-25, wherein the apparatus comprises one or more processors including a graphics processor co-located with an application processor on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed:

1. An apparatus comprising:
   one or more cameras coupled to one or more processors, wherein the one or more processors to facilitate the one or more cameras to capture a video stream of scene having images of persons, the one or more processors to:
   evaluate the images and approximate depth values of the persons;
   detect, based on the approximate depth values, the persons in the scene and partition the persons into depth-based tiles using the depth values;
   compute, based on the approximate depth values, depth torso lengths of the persons; and
   classify, based on the depth torso lengths, the persons as adults or children, and estimate pixel locations of one or more body parts of each person to detect placement and length of each of the one or more body parts.

2. The apparatus of claim 1, wherein a first set of persons is classified as the adults based on a first set of depth torso lengths corresponding to the first set of persons being greater than a threshold value, and wherein a second set of persons is classified as the children based on a second set of depth torso lengths corresponding to the second set of persons being lower than or equal to the threshold value, wherein the threshold value represents a separation age point between adults age and child age.

3. The apparatus of claim 1, wherein the one or more processors are further to:
facilitate a deep neural network to scale the depth-based tiles, where scaling of the depth-based tiles includes red green blue (RGB) tile scaling, wherein the one or more body parts include one or more of heads, necks, shoulders, and hips.

4. The apparatus of claim 3, wherein the one or more processors are further to compute image torso length of the persons, wherein an image torso length of a person represents a distance between a neck and a hip center of the person.

5. The apparatus of claim 1, wherein the one or more processors are further to convert the image torso lengths into the depth torso lengths of the persons based on normalized depths associated with the persons, wherein a depth torso length represents a real torso length, and wherein each normalized depth is inferred from a position of each person with respect to the one or more cameras.

6. The apparatus of claim 5, wherein a depth torso length represents a real torso length, and wherein each normalized depth is inferred from a position of each person with respect to the one or more cameras, wherein the one or more processors include a graphics processor co-located with an application processor on a common semiconductor package.

7. A method comprising:
facilitating, by one or more cameras of a computing device, capturing of a video stream of a scene having images of persons;
evaluating the images and approximate depth values of the persons;
detecting, based on the approximate depth values, the persons in the scene and partition the persons into depth-based tiles using the depth values;
computing, based on the approximate depth values, depth torso lengths of the persons; and
classifying, based on the depth torso lengths, the persons as adults or children, and
estimating pixel locations of one or more body parts of each person to detect placement and length of each of the one or more body parts.

8. The method of claim 7, wherein a first set of persons is classified as the adults based on a first set of depth torso lengths corresponding to the first set of persons being greater than a threshold value, and wherein a second set of persons is classified as the children based on a second set of depth torso lengths corresponding to the second set of persons being lower than or equal to the threshold value, wherein the threshold value represents a separation age point between adults age and child age.

9. The method of claim 7, wherein the one or more processors are further to:
facilitate a deep neural network to scale the depth-based tiles, where scaling of the depth-based tiles includes red green blue (RGB) tile scaling, wherein the one or more body parts include one or more of heads, necks, shoulders, and hips.

10. The method of claim 9, wherein the one or more processors are further to compute image torso length of the persons, wherein an image torso length of a person represents a distance between a neck and a hip center of the person.

11. The method of claim 7, wherein the one or more processors are further to convert the image torso lengths into the depth torso lengths of the persons based on normalized depths associated with the persons, wherein a depth torso length represents a real torso length, and wherein each normalized depth is inferred from a position of each person with respect to the one or more cameras.

12. The method of claim 11, wherein a depth torso length represents a real torso length, and wherein each normalized depth is inferred from a position of each person with respect to the one or more cameras, wherein the one or more processors include a graphics processor co-located with an application processor on a common semiconductor package.

13. At least one non-transitory machine-readable medium comprising instructions which, when executed by a computing device, cause the computing device to perform operations comprising:
facilitating, by one or more cameras, capturing of a video stream of a scene having images of persons;
evaluating the images and approximate depth values of the persons;
detecting, based on the approximate depth values, the persons in the scene and partition the persons into depth-based tiles using the depth values;
computing, based on the approximate depth values, depth torso lengths of the persons; and
classifying, based on the depth torso lengths, the persons as adults or children, and
estimating pixel locations of one or more body parts of each person to detect placement and length of each of the one or more body parts.

14. The non-transitory machine-readable medium of claim 13, wherein a first set of persons is classified as the adults based on a first set of depth torso lengths corresponding to the first set of persons being greater than a threshold value, and wherein a second set of persons is classified as the children based on a second set of depth torso lengths corresponding to the second set of persons being lower than or equal to the threshold value, wherein the threshold value represents a separation age point between adults age and child age.

15. The non-transitory machine-readable medium of claim 13, wherein the one or more processors are further to:
facilitate a deep neural network to scale the depth-based tiles, where scaling of the depth-based tiles includes red green blue (RGB) tile scaling, wherein the one or more body parts include one or more of heads, necks, shoulders, and hips.

16. The non-transitory machine-readable medium of claim 15, wherein the one or more processors are further to compute image torso length of the persons, wherein an image torso length of a person represents a distance between a neck and a hip center of the person.

17. The non-transitory machine-readable medium of claim 13, wherein the one or more processors are further to convert the image torso lengths into the depth torso lengths of the persons based on normalized depths associated with the persons, wherein a depth torso length represents a real torso length, and wherein each normalized depth is inferred from a position of each person with respect to the one or more cameras.

18. The non-transitory machine-readable medium of claim 17, wherein a depth torso length represents a real torso length, and wherein each normalized depth is inferred from a position of each person with respect to the one or more cameras, wherein the one or more processors include a graphics processor co-located with an application processor on a common semiconductor package.

\* \* \* \* \*